(12) United States Patent
Kalscheur et al.

(10) Patent No.: US 10,719,692 B2
(45) Date of Patent: Jul. 21, 2020

(54) VEIN MATCHING FOR DIFFICULT BIOMETRIC AUTHENTICATION CASES

(71) Applicant: Apple Inc., Cupertino, CA (US)

(72) Inventors: Micah P. Kalscheur, Cupertino, CA (US); Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/900,905

(22) Filed: Feb. 21, 2018

(65) Prior Publication Data

US 2019/0080153 A1 Mar. 14, 2019

Related U.S. Application Data

(60) Provisional application No. 62/556,405, filed on Sep. 9, 2017, provisional application No. 62/556,812, filed on Sep. 11, 2017.

(51) Int. Cl.
| | |
|---|---|
| *G06K 9/00* | (2006.01) |
| *G06F 16/583* | (2019.01) |
| *G06F 16/56* | (2019.01) |
| *G06F 21/32* | (2013.01) |

(52) U.S. Cl.
CPC ......... *G06K 9/00288* (2013.01); *G06F 16/56* (2019.01); *G06F 16/583* (2019.01); *G06F 16/5838* (2019.01); *G06F 21/32* (2013.01); *G06K 9/00255* (2013.01); *G06K 9/00281* (2013.01); *G06K 9/00885* (2013.01); *G06K 9/00892* (2013.01); *G06K 2009/00932* (2013.01)

(58) Field of Classification Search
CPC .......... G06F 21/32; G06F 21/44; G06F 21/31; H04W 12/06
See application file for complete search history.

(56) References Cited

U.S. PATENT DOCUMENTS

| | | | |
|---|---|---|---|
| 7,587,318 B2 | 9/2009 | Seshadri | |
| 8,150,142 B2 | 4/2012 | Freedman et al. | |
| 8,384,997 B2 | 2/2013 | Shpunt et al. | |
| 8,635,066 B2 | 1/2014 | Morrison | |
| 8,749,796 B2 | 6/2014 | Pesach et al. | |
| 8,913,839 B2 | 12/2014 | Ricanek, Jr. et al. | |

(Continued)

FOREIGN PATENT DOCUMENTS

WO 2016127766 A1 8/2016

OTHER PUBLICATIONS

ISR/WO, PCT/US2018/048791, dated Nov. 15, 2018, 17 pages.
(Continued)

*Primary Examiner* — Vincent Rudolph
*Assistant Examiner* — Raphael Schwartz
(74) *Attorney, Agent, or Firm* — Kowert, Hood, Munyon, Rankin & Goetzel, P.C.; Gareth M. Sampson

(57) ABSTRACT

Subepidermal imaging of a face may be used to assess subepidermal features such as blood vessels (e.g., veins) when the device is attempting to authenticate a user in a facial recognition authentication process. Assessment of the subepidermal features may be used to distinguish between users that have closely related facial features (e.g., siblings or twins) in situations where the facial recognition authentication process has less certainty in a decision about recognition of the user's face as an authorized user.

20 Claims, 7 Drawing Sheets

(56) References Cited

U.S. PATENT DOCUMENTS

| | | |
|---|---|---|
| 9,064,257 B2 | 6/2015 | Beigi |
| 9,396,402 B2 | 7/2016 | Vardy |
| 9,526,127 B1 | 12/2016 | Taubman et al. |
| 9,721,150 B2 | 8/2017 | Gottemukkula et al. |
| 9,836,643 B2 | 12/2017 | Saripalle et al. |
| 10,135,822 B2 | 11/2018 | Adams |
| 2008/0298647 A1* | 12/2008 | Orr .................. G06F 21/32 382/124 |
| 2010/0008641 A1 | 1/2010 | Murabayashi |
| 2013/0247175 A1 | 9/2013 | Nechyba et al. |
| 2014/0118520 A1* | 5/2014 | Slaby ............. G06K 9/00926 348/77 |
| 2014/0350924 A1 | 11/2014 | Zurek et al. |
| 2015/0193669 A1* | 7/2015 | Gu .................... G06K 9/46 348/77 |
| 2015/0348548 A1 | 12/2015 | Piernot et al. |
| 2016/0178915 A1 | 6/2016 | Mor et al. |
| 2016/0269411 A1 | 9/2016 | Malachi |
| 2017/0118207 A1 | 4/2017 | Madhu et al. |
| 2017/0344807 A1 | 11/2017 | Jillela et al. |

OTHER PUBLICATIONS

Elisabetta Stefani et al: "Design and Implementation of a Multi-Modal Biometric System for Company Access Control", Algorithms, vol. 10, No. 2, May 27, 2017 (May 27, 2017), p. 61, XP055521053, DOI: 10.3390/a10020061.

Pradeep Buddharaju et al: "Multispectral Face Recognition: Fusion of Visual Imagery with Physiological Information" In: "Digital Video and Audio Broadcasting Technology: A Practical Engineering Guide (3rd edition)", Dec. 31, 2007 (Dec. 31, 2007), XP055521346, ISSN: 1860-4862; ISBN: 978-3-642-11611-7; pp. 91-108, DOI:10.1007/978-3-540-49346-4_7.

Oloyede Ayodele et al: "Current Practices in Information Fusion for Multimodal Biometrics", American Journal of Engineering Research, Apr. 30, 2017 (Apr. 30, 2017), XP055521026, Retrieved from the Internet: URL:http://www.ajer.org/papers/v6(04)/R0604148154.pdf [retrieved on Nov. 5, 2018].

Moulay Akhloufi et al: "State of the art in infrared face recognition",QIRT Journal—Quantitative Infrared Thermography: An International Journal on IR Thermography, vol. 5, No. 1, Jun. 1, 2008 (Jun. 1, 2008), pp. 3-26, XP055521020, Cachan Cedex; ISSN: 1768-6733, DOI: 10.3166/qirt.5.3-26.

IPRP, PCTUS2018/048791, dated Mar. 19, 2020. 12 pages.

* cited by examiner

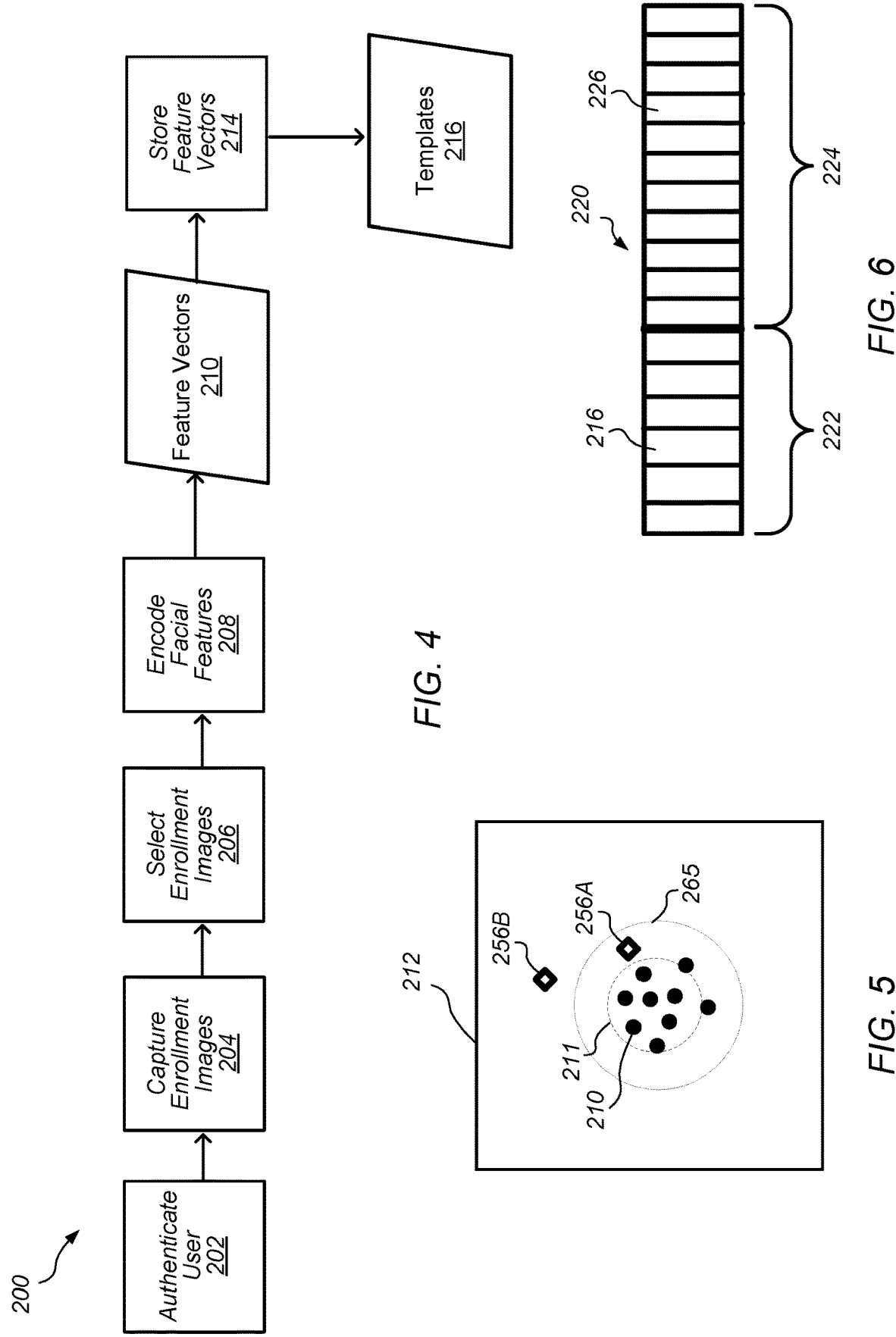

VEIN MATCHING FOR DIFFICULT BIOMETRIC AUTHENTICATION CASES

PRIORITY CLAIM

This patent claims priority to U.S. Provisional Patent Application No. 62/556,405 to Kalscheur et al., entitled "VEIN MATCHING FOR DIFFICULT BIOMETRIC AUTHENTICATION CASES", filed Sep. 9, 2017; and to U.S. Provisional Patent Application No. 62/556,812 to Kalscheur et al., entitled "VEIN MATCHING FOR DIFFICULT BIOMETRIC AUTHENTICATION CASES", filed Sep. 11, 2017; each of which are incorporated by reference in their entirety.

BACKGROUND

1. Technical Field

Embodiments described herein relate to methods and systems for face detection in images capture by a camera on a device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, there are potential cases where a user attempting to be authenticated (authorized) by a device cannot be distinguished from another user with closely related facial features. For example, it may be difficult for a facial recognition authentication process to distinguish between siblings, twins, and other closely related faces. When the authentication process cannot distinguish between closely related faces, additional authentication processes may be used to reduce or prevent increases in a false acceptance rate.

SUMMARY

Subepidermal imaging of a face of a user attempting to unlock a device may be used to enhance a facial recognition authentication process (e.g., enhance the security of the facial recognition authentication process). Subepidermal images of the user may be used to assess subepidermal features such as blood vessels (e.g., veins) when the device is attempting to authenticate the user. The subepidermal features may be compared to templates of subepidermal features for an authorized (e.g., enrolled) user of the device. Assessment of subepidermal features during the facial recognition authentication process may be useful in distinguishing between users that have closely related facial features (e.g., siblings or twins). In addition, assessment of subepidermal features may be used to prevent unlocking of the device by an unauthorized user wearing a mask or using another face replication method.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 4 depicts a flowchart of an embodiment of an image enrollment process for an authorized user of a device.

FIG. 5 depicts a representation of an embodiment of a feature space with feature vectors after an enrollment process.

FIG. 6 depicts a representation of an embodiment of a template space of a memory.

Figure 1:
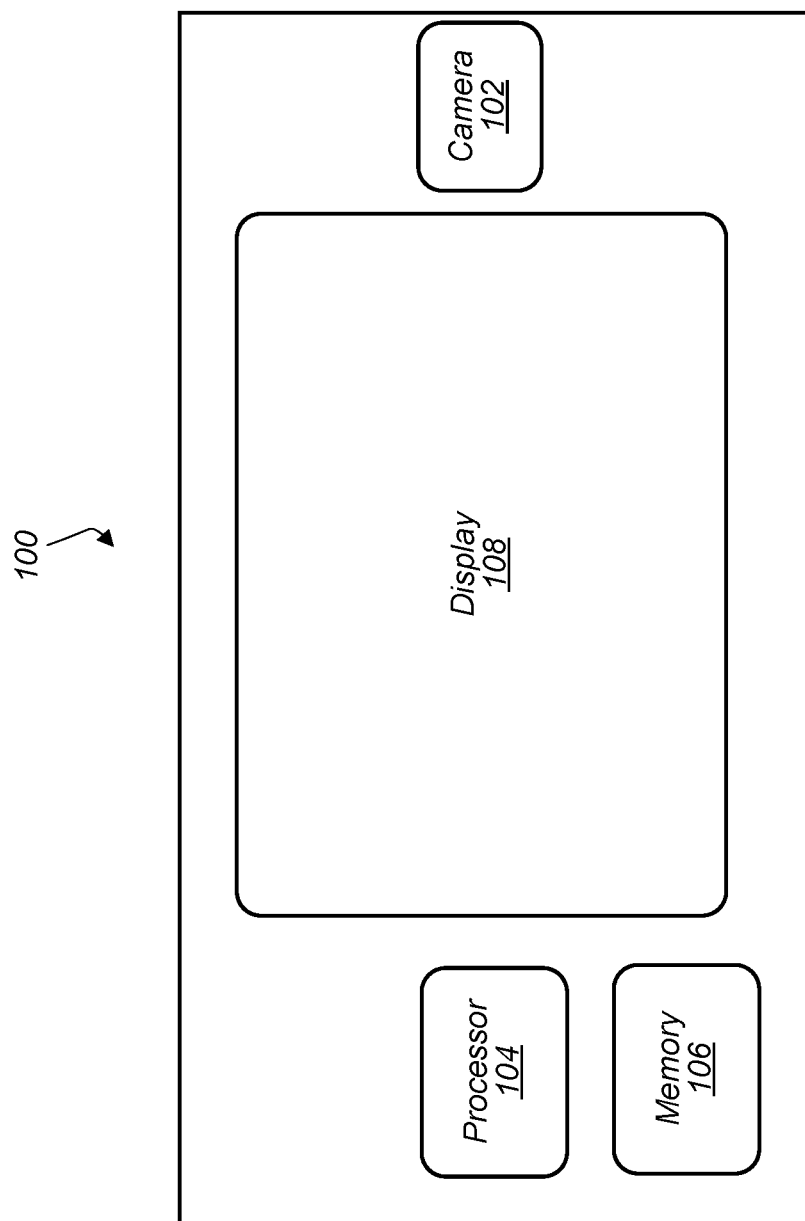
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as desktop computers, laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
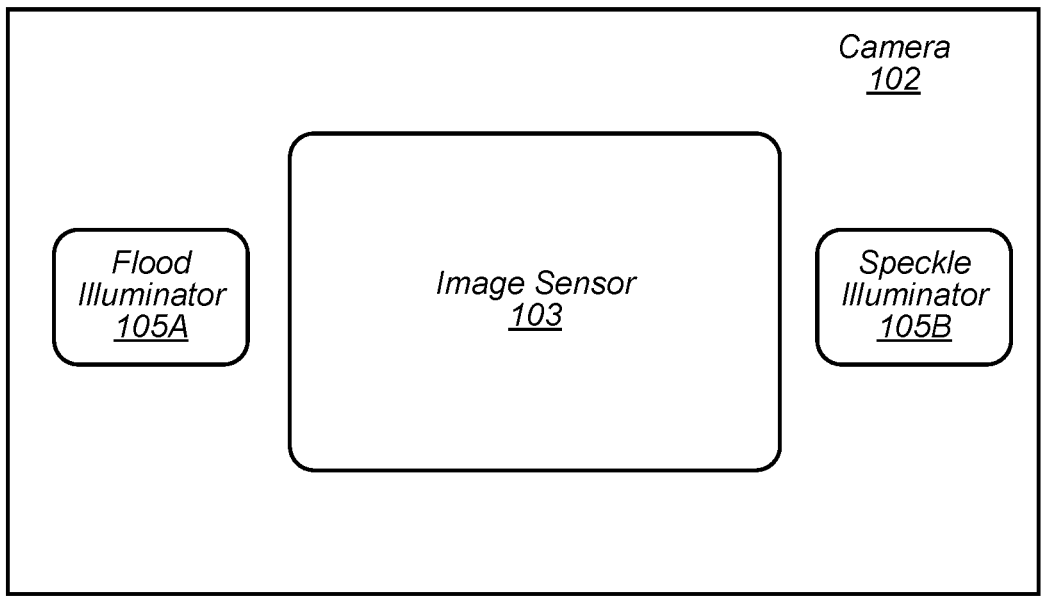
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator) and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor used to capture infrared images used for face detection and/or depth detection. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein. In some embodiments, other light pattern geometries may be used instead of, or in addition to, speckle pattern illumination. For example, geometries with grid lines of illumination or light pattern geometries that produce structured illumination patterns on the subject may be used for illumination of the subject.

In some embodiments, illuminator 105A and/or illuminator 105B provide IR illumination with a wavelength in a near-IR wavelength range (e.g., the wavelength may be in a range between about 780 nm and about 1050 nm) while image sensor 103 (e.g., a silicon sensor) captures images at such wavelengths. Infrared illumination in the near-IR wavelength range may be undetectable to a user of device 100 (e.g., the user cannot see light provided by illuminator 105A and illuminator 105B). In some embodiments, other IR wavelengths, or a combination of near-IR wavelengths, may be used instead of, or in addition to, the wavelength illumination in the near-IR range. In some embodiments, subepidermal images are captured when illuminating the face of the user with near-IR wavelength illumination. In some embodiments, another long wavelength illumination (e.g., long-wavelength IR with a range of wavelengths between about 10 µm and about 14 µm) may be used instead of, or in addition to, the wavelength illumination in the near-IR range.

In certain embodiments, images captured by camera 102 include images with the user's face (e.g., the user's face is included in the images). An image with the user's face may include any digital image with the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
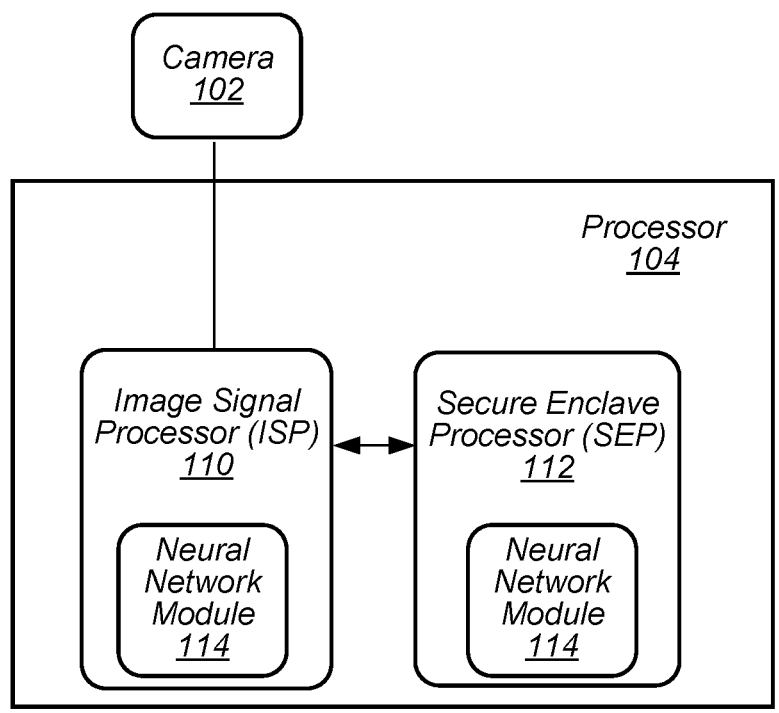
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture and store images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature data from the images) from the enrollment process are stored in a template in device 100. The template may be stored, for example, in a template space in memory 106 of device 100. In some embodiments, the template space may be updated by the addition and/or subtraction of images from the template. A template update process may be performed by processor 104 to add and/or subtract template images from the template space. For example, the template space may be updated with additional images to adapt to changes in the authorized user's appearance and/or changes in hardware performance over time. Images may be subtracted from the template space to compensate for the addition of images when the template space for storing template images is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored template images for each type of image to generate an authentication score (e.g., a matching score or other ranking of matching between the user in the captured image and in the stored template images) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored template images to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create one or more templates of images (e.g., an enrollment profile) for an authorized user of device 100 that are stored in the device (e.g., in a memory coupled to SEP 112) and then used in a facial recognition process to allow the user to use the device (e.g., unlock the device). The enrollment profile (e.g., template of images) created by image enrollment process 200 may be associated that particular image enrollment process (and the images used to enroll during the process). For example, an authorized user may create a first enrollment profile associated with the user that includes the user's face with glasses. The authorized user may also create a second enrollment profile associated with the user that includes the user's face without glasses. Each of the first and second enrollment profiles may then be used in the facial recognition process to allow the user to use the device (e.g., unlock the device).

In certain embodiments, process 200 is used when device 100 is used a first time by the authorized user and/or when the user opts to enroll in a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, and/or re-enroll.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by speckle illuminator 105B (e.g., depth map images). As described herein, flood IR images and depth map images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for use as template images. For example, the selection of images that are suitable for use as template images in 206 may include assessing one or more selected criteria for the images and selecting images that meet the selected criteria. The selected images may be used as template images for the user. Selected criteria may include, but not be limited to, the face of the user being in the field of view of the camera, a pose of the user being proper (e.g., the user's face is not turned to far in any direction from the camera (i.e., the pitch, yaw, and/or roll of the face are not above certain levels) a distance to the face of the user being within a certain distance, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images. In some embodiments, if the selected criteria are preventing the user from being enrolled (e.g., no enrollment images are being selected), then one or more of the selected criteria may be disabled to allow the user to be enrolled on the device. For example, occlusion criteria and/or attention criteria may be turned off/disabled if the user is having difficulty being enrolled.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5. Feature vectors 256A and 256B (open diamonds) are feature vectors obtained from facial recognition process 250, described below.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory. In some embodiments, static templates 216 (and other templates described herein) include separate templates for feature vectors from the enrollment flood IR images and for feature vectors from the enrollment depth map images. It is to be understood that the separate templates for flood IR images and depth map images may be used independently and/or in combination during additional processes described herein. For simplicity in this disclosure, static templates 216 are described generically and it should be understood that static templates 216 (and the use of the templates) may refer to either templates for flood IR images or templates for depth map images. In some embodiments, a combination of the flood IR images and depth map images may be used. For example, pairs of flood IR images and depth map images may be stored in static templates 216 to be used in one or more facial recognition processes on device 100.

FIG. 6 depicts a representation of an embodiment of template space 220 of the memory. In some embodiments, template space 220 includes static portion 222 and dynamic portion 224. Static templates 216 may be, for example, static templates added to static portion 222 of template space 220 (e.g., the templates are permanently added to the memory and are not deleted or changed unless the device is reset and another enrollment process takes place). In some embodiments, static portion 222 includes a certain number of static templates 216. For example, for the embodiment of template space 220 depicted in FIG. 6, six templates may be allowed in static portion 222. After the enrollment process and the static templates 216 are added to static portion 222, additional dynamic templates 226 may be added to dynamic portion 224 of template space 220 (e.g., a portion from which templates may be added and deleted without a device reset being needed).

Static templates 216 may thus be enrollment templates (or reference templates) generated by enrollment process 200. After enrollment process 200 is completed, a selected number of static templates 216 are stored in static portion 222 of template space 220. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user. Template space 220 may then be used in a facial recognition authentication process.

Figure 7:
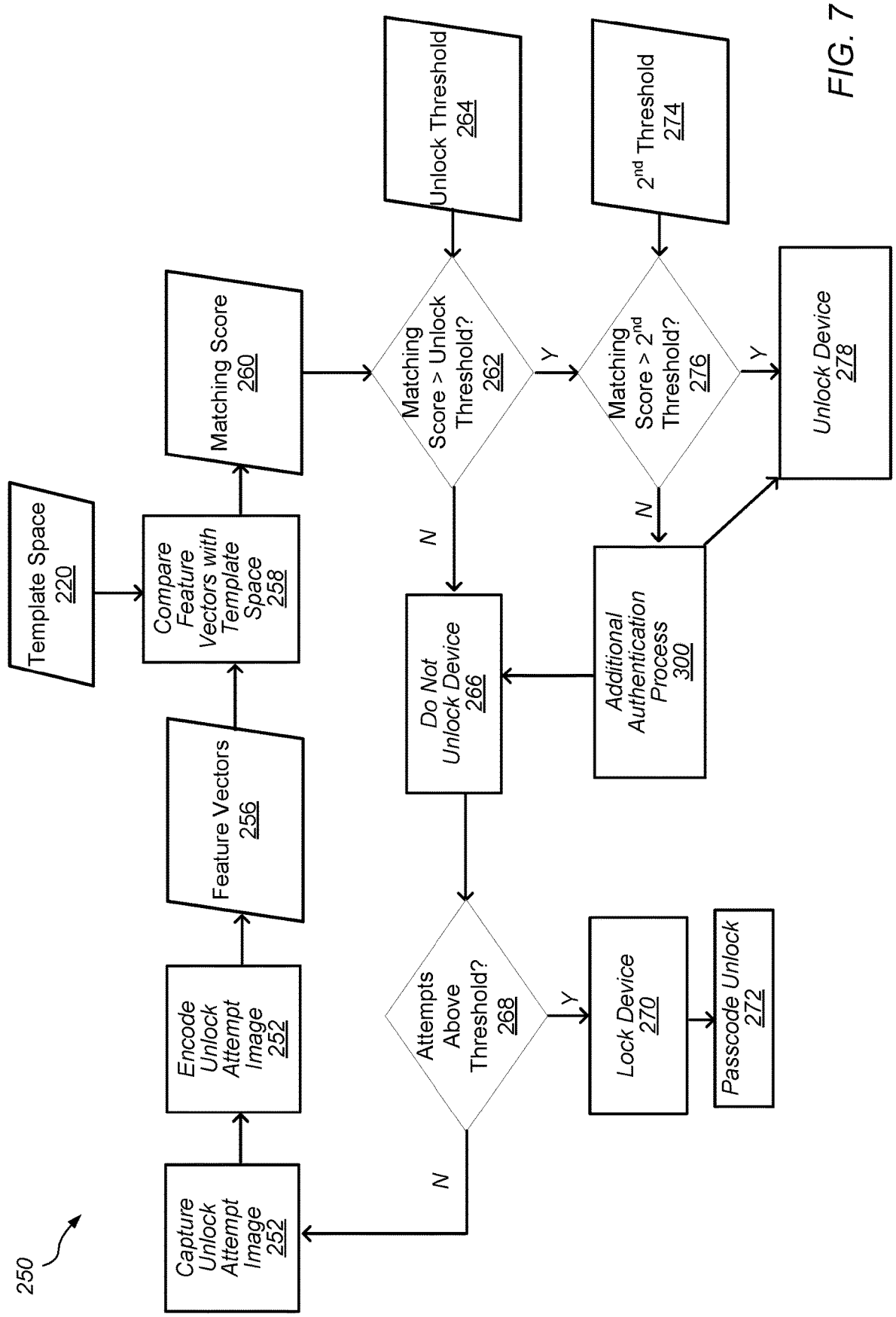
FIG. 7 depicts a flowchart of an embodiment of facial recognition authentication process.

FIG. 7 depicts a flowchart of an embodiment of facial recognition authentication process 250. Process 250 may be used to authenticate a user as an authorized user of device 100 using facial recognition of the user. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In 252, camera 102 captures an image of the face of the user attempting to be authenticated for access to device 100 (e.g., the camera captures an "unlock attempt" image of the user). It is to be understood that the unlock attempt image may be a single image of the face of the user (e.g., a single flood IR image or single depth map image) or the unlock attempt image may be a series of several images of the face of the user taken over a short period of time (e.g., one second or less). In some embodiments, the series of several images of the face of the user includes pairs of flood IR images and depth map images (e.g., pairs of consecutive flood IR and depth map images). In some implementations, the unlock attempt image may be a composite of several images of the user illuminated by the flood illuminator and the speckle pattern illuminator.

Camera 102 may capture the unlock attempt image in response to a prompt by the user. For example, the unlock attempt image may be captured when the user attempts to access to device 100 by pressing a button (e.g., a home button or virtual button) on device 100, by moving the device into a selected position relative to the user's face (e.g., the user moves the device such that the camera is pointed directly at the user's face), and/or by making a specific gesture or movement with respect to the device. It is to be understood that, as described herein, unlock attempt images may include either flood IR images or depth map images, or a combination thereof. Further, the unlock attempt images may be processed in association with their corresponding template (e.g., flood IR images with a template for flood IR enrollment images) independently or in combination as needed.

In 254, the unlock attempt image is encoded to define the facial features of the user as one or more feature vectors in the feature space. In some embodiments, one feature vector is defined for the unlock attempt image. In some embodiments, more than one feature vector is defined for the unlock attempt image. Unlock feature vector(s) 256 may be the output of the encoding of the unlock attempt image in 254.

In certain embodiments, in 258, unlock feature vector(s) 256 are compared to feature vectors in the templates of template space 220 to get matching score 260 for the unlock attempt image. Matching score 260 may be a score of the differences between feature vector(s) 256 and feature vectors in template space 220 (e.g., feature vectors in static templates 216 and/or other dynamic templates 226 added to the template space as described herein). The closer (e.g., the less distance or less differences) that feature vector(s) 256 and the feature vectors in template space 220 are, the higher matching score 260 may be. For example, as shown in FIG. 5, feature vector 256A (open diamond) is closer to feature vectors 210 than feature vector 256B (open diamond)(e.g., feature vector 256B is a further outlier than feature vector 256A). Thus, feature vector 256A would have a higher matching score than feature vector 256A. As feature vector 256B is further away from feature vectors 210 than feature vector 256A, the lower matching score for feature vector 256B means less confidence that the face in the unlock attempt image associated with feature vector 256B is the face of the authorized user from enrollment process 200.

In some embodiments, comparing feature vector(s) 256 and templates from template space 220 to get matching score 260 includes using one or more classifiers or a classification-enabled network to classify and evaluate the differences between feature vector(s) 256 and templates from template space 220. Examples of different classifiers that may be used include, but are not limited to, linear, piecewise linear, nonlinear classifiers, support vector machines, and neural network classifiers. In some embodiments, matching score 260 is assessed using distance scores between feature vector(s) 256 and templates from template space 220.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., static templates 216 in template space 220). As further example, unlock threshold 264 may be represented by circle 265 in feature space 212, depicted in FIG. 5. As shown in FIG. 5, feature vector 256A is inside circle 265 and thus feature vector 256A would have matching score 260 above unlock threshold 264. Feature vector 256B, however, is outside circle 265 and thus feature vector 256B would have matching score 260 below unlock threshold 264. In certain embodiments, unlock threshold 264 is set during manufacturing and/or by the firmware of device 100. In some embodiments, unlock threshold 264 is updated (e.g., adjusted) by device 100 during operation of the device.

In 262, if matching score 260 is below unlock threshold 264 (e.g., not equal to or above the unlock threshold), then device 100 is not unlocked in 266. It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In some embodiments, in 268, a number of unlock attempts is counted (e.g., the number of attempts to unlock device 100 with a different unlock attempt image captured in 252). If the number of unlock attempts in 268 is below a selected value (e.g., a threshold), then process 250 may be run again with another unlock attempt image (e.g., a new image of the user is captured (e.g., a flood IR image or a depth map image)). In some implementations, device 100 automatically captures the new image of the user's face without prompting the user. In some embodiments, the user attempting to unlock device 100 may have additional image(s) of his/her face captured by camera 102.

If the number of unlock attempts is above the selected value, then device 100 is locked from further attempts to use facial authentication in 270. In some embodiments, when the device is locked in 270, an error message may be displayed (e.g., on display 108) indicating that facial recognition authentication process 250 has failed and/or the desired operation of device 100 is restricted or prevented from being performed. Device 100 may be locked from further attempts to use facial authentication in 270 for a specified period of time and/or until another authentication protocol is used to unlock the device. For example, passcode unlock 272 may be used to unlock device 100. Passcode unlock 272 may include using a passcode, a password, pattern entry, a different form of biometric authentication, or another authentication protocol to unlock device 100. In some embodiments, passcode unlock 272 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device.

As shown in FIG. 7, in 262, if matching score 260 is above unlock threshold 264 (i.e., the user's face in the unlock attempt image substantially matches the face of the authorized user), then the matching score is compared to second threshold 274 in 276. Second threshold 274 may be a higher threshold than unlock threshold 264 (e.g., the second threshold requires closer matching between the user's face in the unlock attempt image and the face of the authorized user and the distance between feature vectors in the captured images and feature vectors in the templates to be closer). As shown in FIG. 7, if matching score 260 is above second threshold 274 in 276, the user in the unlock attempt image is authenticated as the authorized user of device 100 and the device is unlocked in 278. In some embodiments, the device is authorized to be unlocked in 278 but not unlocked unless another unlock authorization is provided (e.g., an unlock authorization from an additional authentication process such as authentication process 300, described herein).

In certain embodiments, second threshold 274 is a threshold that is close to unlock threshold 264 to define a range of matching scores that have some uncertainty (e.g., second threshold 274 may define a small range of matching scores above the unlock threshold). In 276, matching scores that are above second threshold 274 have already passed unlock threshold 264 but these matching scores do not provide a high level of confidence in matching between the user attempting to unlock device 100 and an authorized user defined in template space 220. In some embodiments, the user attempting to unlock device 100 may be an additional user that has facial features that are very similar or closely related to the facial features of the authorized user defined in template space 220. The additional user may be, for example, a sibling or twin of the authorized user that has facial features very similar to the facial features of the authorized user. The additional user may, however, not be authorized to use device 100 (e.g., be an unauthorized user). In such embodiments, the additional user may generate a matching score that passes unlock threshold 264 but is close to the unlock threshold. If only unlock threshold 264 is used for the unlocking criteria, the additional user may be able to unlock device 100 through authentication process 250 (e.g., the unlock process) even though the additional user has not been enrolled on the device (e.g., enrolled using process 200).

Thus, in some embodiments, second threshold 274 and comparison 276 are used to trigger or activate additional authentication process 300 (e.g., a vein matching authentication process) when the user attempting to unlock the device has a matching score that is within a certain range of unlock threshold 264 (with the range being defined by the second threshold). In certain embodiments, as shown in FIG. 7, if matching score 260 is below second threshold 274 in 276 (as well as being above unlock threshold 264), then additional authentication process 300 is activated.

Figure 8:
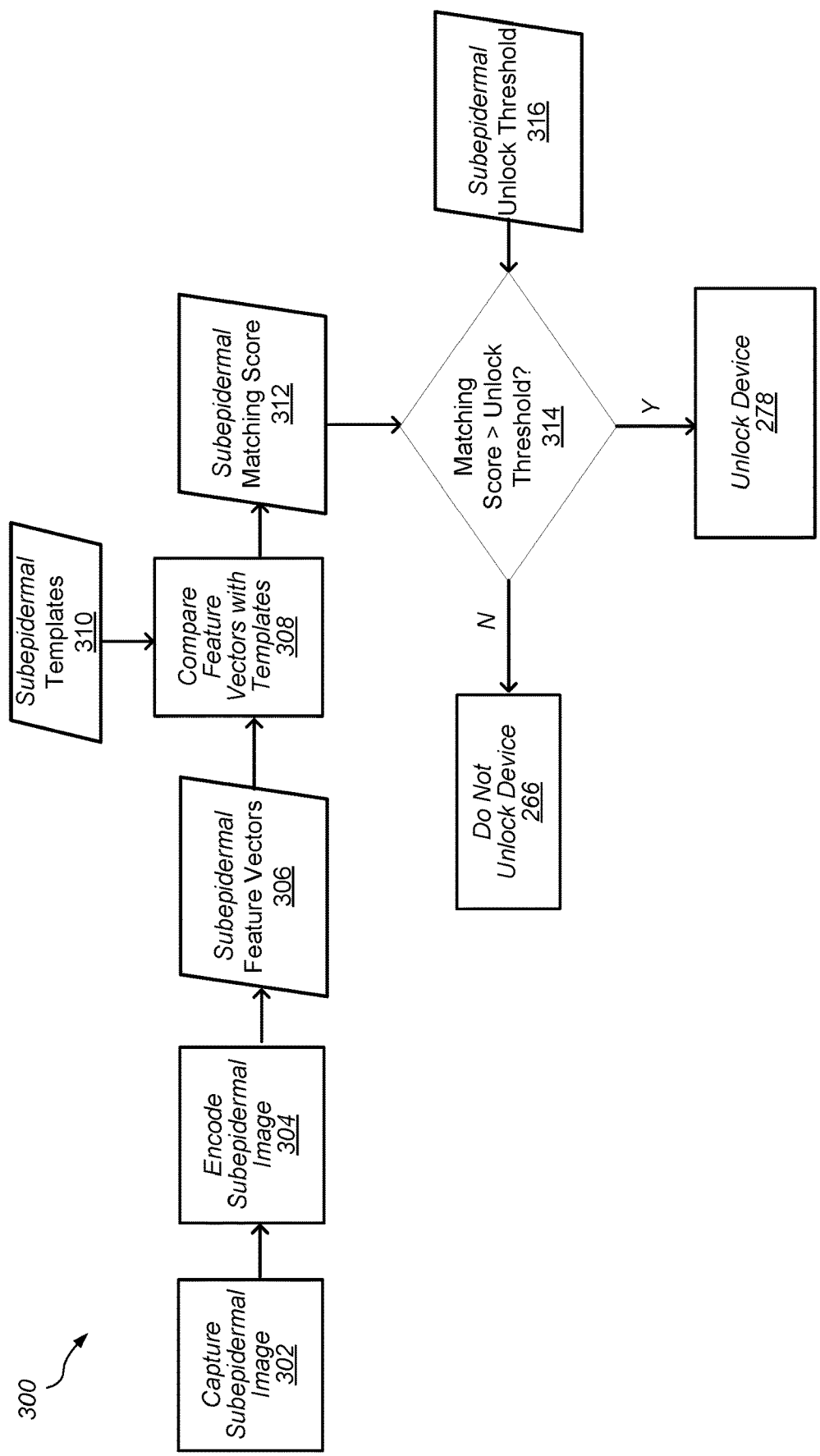
FIG. 8 depicts a flowchart of an embodiment of additional authentication process.

FIG. 8 depicts a flowchart of an embodiment of additional authentication process 300. Additional authentication process 300 may be, for example, a vein matching authentication process used to distinguish between an unauthorized user and an authorized user that have closely related (e.g., very similar) facial features to prevent the unauthorized user from accessing device 100 without authorization. Users with closely related (or very similar) facial features include users that have facial features that are close enough in distance (e.g., as defined by feature vectors in the feature space) that the similar facial features may be clustered together and/or there is at least some overlap between the similar facial features when assessing a matching score based on the facial features. In certain embodiments, process 300 is operated by a different neural network modules and/or machine learning models than process 250. In some embodiments, process 300 and process 250 are operated by the same neural network module and/or machine learning model.

In certain embodiments, process 300 begins with capturing one or more subepidermal images of a user's face in 302. A subepidermal image may be captured using image sensor 103 and/or another image sensor on device 100. In certain embodiments, the subepidermal image is captured when illuminating the face of the user with near-IR or another long wavelength illumination. For example, in certain embodiments, unlock attempt images (captured in 252 of process 250) are captured at a wavelength in the near-IR wavelength range, as described above. The subepidermal image may, however, be captured at another wavelength that provides more light penetration beneath the skin of the user (e.g., more penetration into the subepidermal layers). For example, the subepidermal image may be captured using illumination shifted about 10 nm or more from the illumination used to capture the unlock attempt images. Shifting of the wavelength to lower wavelengths may, however, produce some light that is visible to a human eye (e.g., some light in or near the visible spectrum).

In some embodiments, the illumination for capturing subepidermal images is provided by one or more portions of illuminator 105A and/or illuminator 105B, shown in FIG. 2. For example, illuminator 105A and/or illuminator 105B may include an array of light sources such as, but not limited to, VCSELs (vertical-cavity surface-emitting lasers). A first set of light sources in the array may provide illumination at a wavelength for unlock attempt images while a second set of light sources may provide illumination at a wavelength for subepidermal images. The different sets of light sources may be turned on/off separately to allow a specific illumination (e.g., a specific wavelength of illumination) to be provided.

In some embodiments, the subepidermal image captured in 302 is captured in association with the unlock attempt images captured in 252 (e.g., when matchings score 260 is below second threshold 274 in 276, as shown in FIG. 7). For example, the unlock attempt images captured in 252 may include a series of images captured over a small time frame (e.g., 60 frames in a second) to provide a set of images at a moment in time. The subepidermal image captured in 302 may be captured as a single image or a small number of images within the series of images captured for the unlock attempt images. Capturing only a single subepidermal image or a small number of subepidermal images may allow capturing of the subepidermal images to be undetected by the user even if the illumination used for the subepidermal images is somewhat visible to the human eye as described above.

Figure 9:
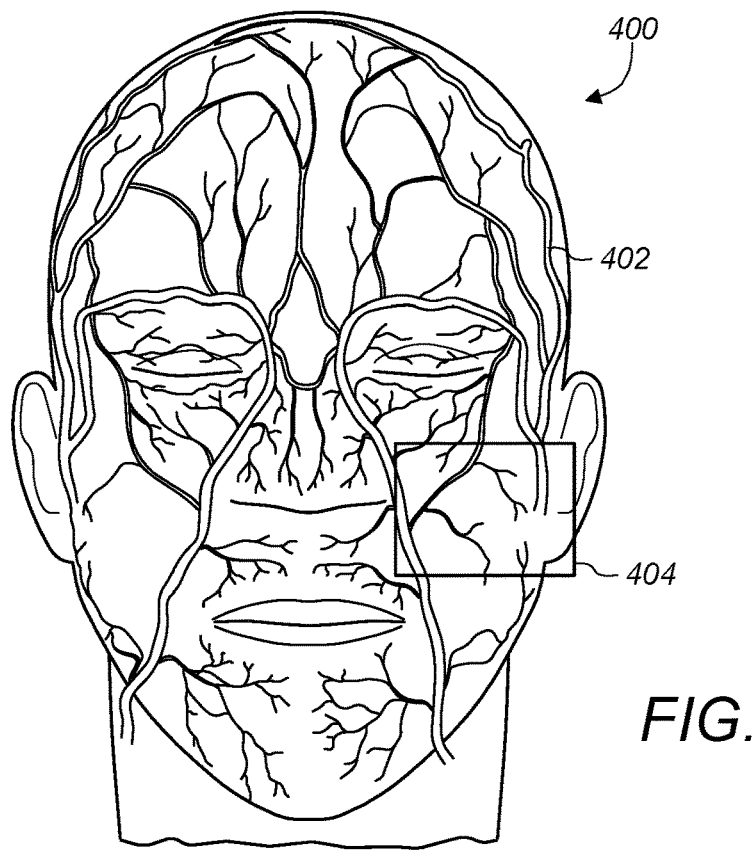
FIG. 9 depicts a representation of an embodiment of an image of subepidermal features in a user's face.

In certain embodiments, the captured subepidermal image includes an image of one or more blood vessels (e.g., veins) in the user's face. FIG. 9 depicts a representation of an embodiment of an image of subepidermal features in a user's face. As shown in FIG. 9, face 400 includes a plurality of blood vessels 402 (e.g., veins). Unlike some other facial features on the surface of the skin of a user's face, veins in the subepidermal layers of the face are typically unique to an individual and vein patterns are different between different individuals, even siblings or twins. Thus, assessment of the veins (and vein patterns) in the subepidermal layers of the face may be used to distinguish between siblings, twins, or other users with similar facial features on the surface of the face. In some embodiments, absorption properties of blood at a selected wavelength may be used to detect vein or other blood vessels in the subepidermal layers. Absorption properties of blood vessels may be useful in differentiating vein features in the eyes of the user.

In some embodiments, the captured subepidermal image includes an image of one or more localized regions of the user's face instead of the entire user's face. For example, as shown in FIG. 9, the captured subepidermal image may only include localized region 404. Capturing an image of a localized region of the user's face may reduce the size of the captured image and/or allow process 300 to focus on a certain region (or regions) of the face that may best be used to distinguish between different users. For example, in some embodiments, the captured subepidermal image may include an image of one or more of the user's cheek, eyes, and/or forehead. As shown in FIG. 9, localized region 404 includes the user's cheek. These localized regions of the user's face may be used for the captured subepidermal images as blood vessels in these regions may most readily be used to distinguish between different users.

Figure 10:
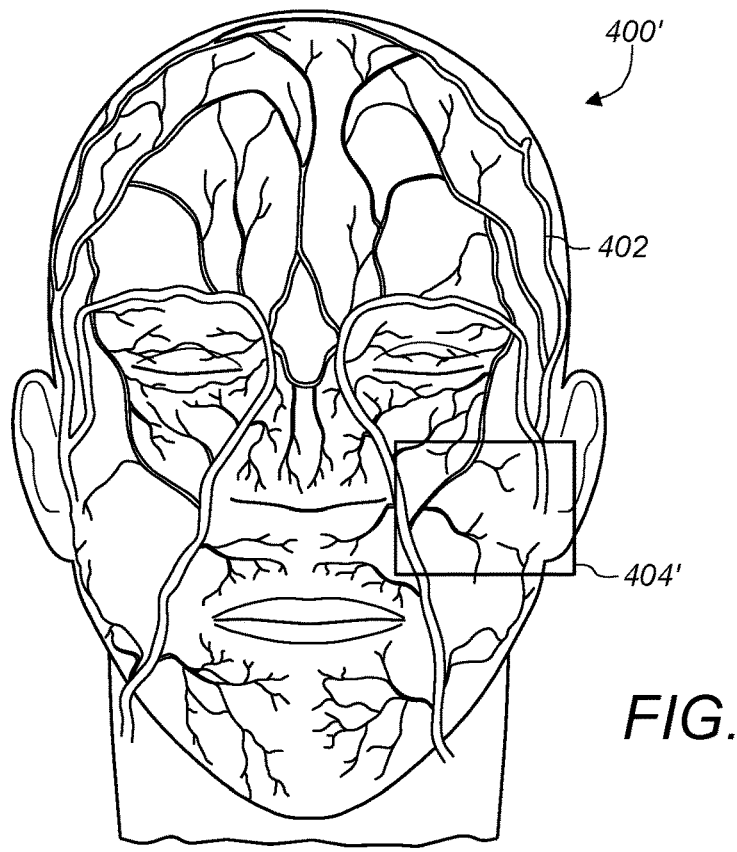
FIG. 10 depicts a representation of another embodiment of an image of sub epidermal features in a user's face.

For example, FIG. 10 depicts a representation of an embodiment of an image of subepidermal features in a different user's face (e.g., a different user from the user in FIG. 9). Face 400', shown in FIG. 10, includes localized region 404'. As shown in FIGS. 9 and 10, localized region 404 includes a different blood vessel (vein) pattern than localized region 404'. The differences in the blood vessel patterns of localized region 404 and localized region 404' may be used to distinguish face 400 from face 400'.

In some embodiments, capturing a subepidermal image of a localized region of a user's face includes directing illumination at the localized region on the user's face. For example, the light sources in the array of light sources may be individually addressable (e.g., the light sources can be turned on/off individually). In such embodiments, another process or algorithm may be used to detect where the facial regions of interest are located (e.g., where the eyes, cheeks, and/or forehead are located) on the user's face. For example, landmark feature maps may be used to identify facial features of the user in the unlock attempt images and then illumination for the subepidermal image may be directed to the localized region(s) of interest. Identification of landmark features may be accomplished as described in the U.S. Provisional Patent Application No. 62/556,795 to Fasel, Tajbakhsh, Wu, and Gernoth entitled "OCCLUSION DETECTION FOR FACIAL RECOGNITION PROCESSES" filed Sep. 11, 2017, which is incorporated by reference as if fully set forth herein.

After the subepidermal image is captured in 302, process 300 may continue with encoding the captured subepidermal image in 304. Encoding of the subepidermal image may generate one or more subepidermal feature vectors 306. In certain embodiments, subepidermal feature vectors 306 include feature vectors for veins in the captured subepidermal image (e.g., "vein feature vectors"). Subepidermal feature vectors 306 may, however, also include feature vectors for other blood vessels and/or other subepidermal features from the captured image.

In 308, subepidermal feature vectors 306 are compared to subepidermal templates 310 to get subepidermal matching score 312. Subepidermal templates 310 may include, for example, templates (e.g., enrollment or reference templates) for veins or other subepidermal features from enrollment images (e.g., subepidermal enrollment images captured during process 200). Subepidermal enrollment images may be captured by capturing a single subepidermal image (or a small number of subepidermal image) in association with capturing multiple enrollment images in 204 during process 200, as described above.

Subepidermal templates 310 may be stored separately from static templates 216 and template space 220. In certain embodiments, subepidermal templates 310 include templates (e.g., feature vectors) from images of only selected (localized) regions of the authorized user's face (e.g., the cheek, eyes, and/or forehead). Thus, in 308 only subepidermal feature vectors 306 from these regions may be compared to subepidermal templates 310. Comparing only in the localized regions reduces the area for comparison of subepidermal feature vectors 306 and subepidermal templates 310. Reducing the area for comparison may improve processing speed for the comparison and utilize fewer system resources.

After subepidermal matching score 312 is obtained, the subepidermal matching score may be compared to subepidermal unlock threshold 316 for device 100 in 314. Subepidermal unlock threshold 316 may represent a maximum allowable distance (as defined by subepidermal feature vectors) between subepidermal features of the face of the authorized user and subepidermal features of the face of the user in the captured subepidermal image that device 100 allows for unlocking of the device. For example, subepidermal unlock threshold 316 may be a value for the distance between the subepidermal features that decides whether the subepidermal features of the user in the subepidermal image is a close enough match to subepidermal features of the authorized user to allow unlocking of device 100. In certain embodiments, subepidermal unlock threshold 316 is set during manufacturing and/or by the firmware of device 100. In some embodiments, subepidermal unlock threshold 316 is updated (e.g., adjusted) by device 100 during operation of the device.

In 314, if subepidermal matching score 312 is above subepidermal unlock threshold 316, the user in the unlock attempt image and in the captured subepidermal image is authenticated as the authorized user of device 100 and the device is unlocked in 278 (also shown in FIG. 7). In 314, if subepidermal matching score 312 is below subepidermal unlock threshold 316, then device 100 is not unlocked in 266 (also shown in FIG. 7). It should be noted that device 100 may be either locked or unlocked if subepidermal matching score 312 is equal to subepidermal unlock threshold 316 depending on a desired setting for the subepidermal unlock threshold (e.g., tighter or looser restrictions).

In some embodiments, additional authentication process 300 is initiated or activated on device 100 by the authorized user. For example, process 300 may be activated in response to the authorized user providing information about one or more siblings or other people that may have closely related features to the authorized user (e.g., the authorized user may answer one or more questions regarding siblings during an enrollment or other device activation process). In some embodiments, process 300 may be activated in response to another function on the device that alerts the device that the user that has been authenticated is not the authorized user. For example, the additional user may have been authorized using process 250 but performed another function on the device that signals the additional user is not the authorized user.

In some embodiments, process 300 may be used to determine if a face in captured images is actually the face of the authorized user (e.g., the user's real face) instead of a replica of the authorized user's face. For example, an unauthorized user may attempt to unlock device 100 by wearing a mask that replicates the authorized user's face or using another replication or spoofing method. The unauthorized user may use a mask that has realistic face/skin material in an attempt to unlock device 100. The face/skin material may, in some cases, allow the unauthorized user to unlock device 100 using process 250 without process 300 being activated.

Activation of process 300 in process 250 may, however, prevent the unauthorized user from unlocking device 100 using the mask or another spoofing method. In some embodiments, if a mask is worn by the unauthorized user (or any other user) during the image capture process for subepidermal images in process 300, the thickness of the mask may prevent detection of any subepidermal features (e.g., encoding of the subepidermal images may not generate any subepidermal feature vectors). Thus, in such embodiments, process 300 would reject the attempt to unlock device 100 using the mask.

In some embodiments, a subepidermal image may be captured independently of process 300. The independently captured image may be used to determine if a face in captured images is actually the face of the authorized user (e.g., the user's real face) instead of a replica of the authorized user's face (e.g., a mask). In such embodiments, capturing the subepidermal image independently allows for independent detection of the presence/non-presence of a mask without the need for activation of process 300.

In some embodiments, the mask may still allow subepidermal features (e.g., veins) to be detected in the subepidermal images (e.g., if the mask is relatively thin or somewhat transparent). In such embodiments, process 300 may distinguish between subepidermal features of the authorized user's real face and subepidermal features of the unauthorized user using the comparison of subepidermal feature vectors in step 308, as described above. Thus, process 300 may provide an authentication process that prevents an unauthorized user from unlocking device 100 by wearing a mask or using another face replication method.

In some embodiments, information about subepidermal features (e.g., veins or other blood vessels) may be assessed using the intensity of illumination detected on the user's face. For example, dot intensity measurements from speckle pattern illumination (and/or other structured pattern illumination) may be used to detect subepidermal features and/or assess information about subepidermal features. Intensity lines in the speckle pattern illumination may correspond to subepidermal features such as veins. A network (e.g., a neural network) that has been trained using known mapped vein patterns may use the intensity lines to determine the presence and location of veins. In some embodiments, the network may be capable of determining the presence and location of veins using illumination at the same wavelength used for typical unlock attempt images (e.g., using near-IR wavelength illumination).

In certain embodiments, one or more process steps described herein may be performed by one or more processors (e.g., a computer processor) executing instructions stored on a non-transitory computer-readable medium. For example, process 200, process 250, and process 300, shown in FIGS. 4, 7, and 8, may have one or more steps performed by one or more processors executing instructions stored as program instructions in a computer readable storage medium (e.g., a non-transitory computer readable storage medium).

Figure 11:
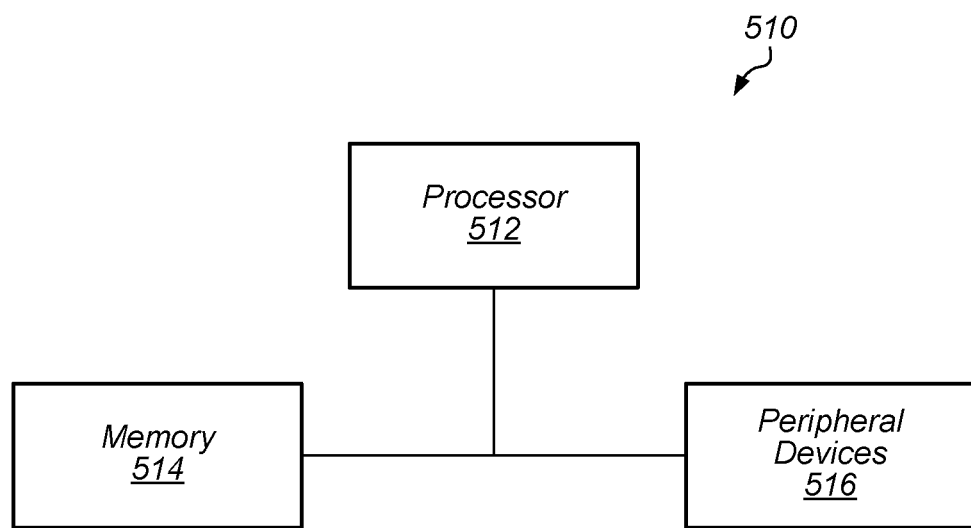
FIG. 11 depicts a block diagram of one embodiment of an exemplary computer system.

FIG. 11 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 250, and process 300, shown in FIGS. 4, 7, and 8. In the embodiment of FIG. 11, computer system 510 includes processor 512, memory 514, and various peripheral devices 516. Processor 512 is coupled to memory 514 and peripheral devices 516. Processor 512 is configured to execute instructions, including the instructions for process 200, process 250, and/or process 300, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 12:
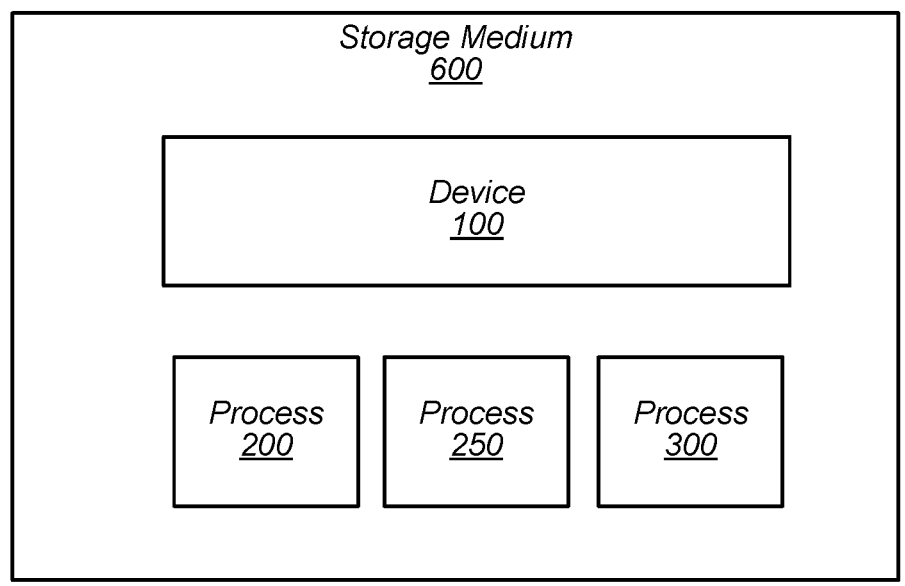
FIG. 12 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 12, other input/output (I/O) devices such as video hardware, audio hardware, user interface devices, networking hardware, etc.).

Turning now to FIG. 12, a block diagram of one embodiment of computer accessible storage medium 600 including one or more data structures representative of device 100 (depicted in FIG. 1) included in an integrated circuit design and one or more code sequences representative of process 200, process 250, and/or process 300 (shown in FIGS. 4, 7, and 8). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
   obtaining one or more first images of a face of a user using a camera located on a device, the device comprising a computer processor and a memory;
   encoding the first image to generate at least one first feature vector, wherein the first feature vector represents one or more facial features of the user in the encoded first image;
   generating a first matching score by comparing the at least one first feature vector to a plurality of reference templates stored in the memory of the device;
   comparing the first matching score to a first unlock threshold for the device;
   in response to the first matching score being above the first unlock threshold, comparing the first matching score to a second unlock threshold for the device, the second unlock threshold being above the first unlock threshold;
   automatically obtaining one or more second images of the face of the user using the camera without prompting the user, wherein the camera is activated to obtain the second images, by the computer processor, in response to the first matching score being above the first unlock threshold and below the second unlock threshold;
   encoding at least one of the second images to generate at least one second feature vector, wherein the second feature vector represents at least one vein feature of the user in the encoded second image;
   generating a second matching score by comparing the at least one second feature vector to at least one vein reference template for the at least one region of the face of the user, the at least one vein reference template being stored in the memory of the device;
   comparing the second matching score to a third unlock threshold for the device; and
   authenticating the user to use the device in response to the second matching score being above the third unlock threshold.

2. The method of claim 1, wherein encoding the at least one vein feature, generating the second matching score, and authenticating the user in response to the second matching score being above the third unlock threshold are performed by the device in response to input provided by an authorized user of the device during an enrollment process on the device.

3. The method of claim 1, wherein the at least one image used to generate the second matching score comprises an image captured at a different wavelength from the at least one image used to generate the first matching score.

4. The method of claim 1, wherein the third unlock threshold is a threshold for matching of the at least one vein feature to at least one vein reference template.

5. The method of claim 1, wherein the at least one region with the at least one vein feature is one of a forehead, an eye, and/or a cheek of the user.

6. The method of claim 1, wherein the reference templates comprise feature vectors generated for an authorized user of the device.

7. The method of claim 1, wherein the at least one vein reference template comprises feature vectors generated for an authorized user of the device and/or a pattern of veins unique to the authorized user.

8. The method of claim 1, further comprising prompting the user to use an additional authentication protocol for authentication in response to the second matching score being below the third unlock threshold.

9. A device, comprising:
   a computer processor;
   a memory;
   a camera;
   at least one illuminator providing infrared illumination;
   circuitry coupled to the camera and the illuminator, wherein the circuitry is configured to:
     obtain a plurality of first images of a face of a user using the camera;
     encode at least one image selected from the first images to generate at least one first feature vector, wherein the first feature vector represents one or more facial features of the user in the encoded first image;
     generate a first matching score by comparing the at least one first feature vector to a plurality of reference templates stored in the memory of the device;
     compare the first matching score to a first unlock threshold for the device and a second unlock threshold for the device, the first unlock threshold being below the second unlock threshold;

wherein:
in response to the first matching score being above the second unlock threshold, the user is authenticated to use the device;
in response to the first matching score being below the second unlock threshold and above the first unlock threshold, the circuitry is configured to automatically, without prompting the user, proceed to:
encode at least one additional image selected from the first images to generate at least one second feature vector, wherein the second feature vector represents at least one vein feature of the user in the encoded first image;
generate a second matching score by comparing the at least one second feature vector to at least one vein reference template for the at least one region of the face of the user, the at least one vein reference template being stored in the memory of the device;
compare the second matching score to a third unlock threshold; and
authenticate the user to use the device in response to the second matching score being above the third unlock threshold.

10. The device of claim 9, wherein the camera comprises an infrared sensor.

11. The device of claim 9, wherein the camera comprises an infrared sensor configured to detect sub epidermal blood vessels.

12. The device of claim 9, wherein the at least one illuminator comprises a flood infrared illuminator and a speckle pattern infrared illuminator.

13. The device of claim 9, wherein at least one illuminator provides at least some illumination that penetrates into a sub epidermal layer of the face of the user.

14. A method, comprising:
determining whether a vein matching operation is to be operated on one or more images of a face of a user captured using a camera located on a device, the device comprising a computer processor and a memory;
wherein determining whether the vein matching operation is to be operated comprises:
generating a matching score by comparing a first feature vector for at least one feature in the face of the user in at least one captured image to at least one feature vector from a plurality of reference templates stored in the memory of the device for an authorized user of the device; and
automatically activating without prompting the user, by the computer processor, the vein matching operation in response to determining that the matching score is between a first unlock threshold and a second unlock threshold; wherein the vein matching operation comprises:
comparing a feature vector for at least one vein in the face of the user in at least one additional captured image to at least one feature vector from a plurality of reference templates of vein features stored in the memory of the device for the authorized user of the device, wherein the at least one additional captured image is captured in response to activation of the vein matching operation;
determining whether the face of the user in the at least one additional captured image is the authorized user for the device based on the comparison of the feature vector for the at least one vein and the at least one feature vector from the plurality of reference templates; and
authenticating the user to use the device in response to determining the face of the user in the at least one additional captured image is the authorized user for the device.

15. The method of claim 14, further comprising generating the feature vector for the at least one vein in the face of the user by encoding the additional captured image to generate the feature vector for the at least one vein.

16. The method of claim 14, wherein determining whether the face of the user in the additional captured image is the authorized user for the device comprises:
generating a second matching score by comparing the feature vector for the at least one vein in the face of the user in at least the additional captured image to the at least one feature vector from the plurality of reference templates; and
comparing the second matching score to a third unlock threshold.

17. The method of claim 16, further comprising authenticating the user to use the device when the second matching score is above the third unlock threshold.

18. The method of claim 14, further comprising authenticating the user to use the device when the matching score is above the second unlock threshold, the second unlock threshold being higher than the first unlock threshold.

19. The method of claim 14, further comprising generating the first feature vector by encoding the at least one captured image.

20. The method of claim 14, further comprising generating the feature vector for the vein in the face of the user by encoding the at least one additional captured image.

* * * * *